INVENTOR.
Ralph A. Beck
BY Hill, Sherman, Meroni, Gross & Simpson ATTORNEYS

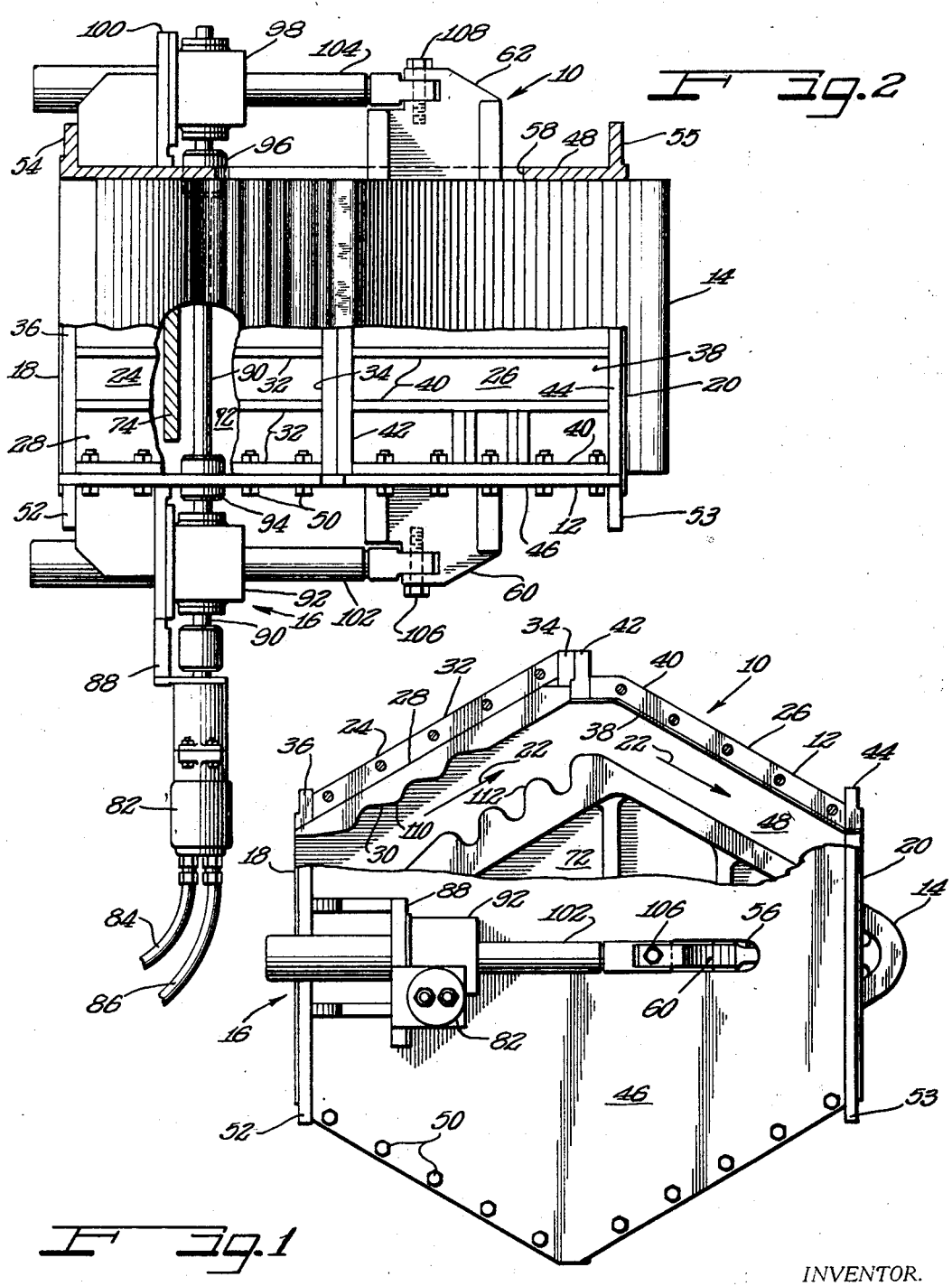

United States Patent Office 3,396,742
Patented Aug. 13, 1968

3,396,742
FLAT-SIDED STREAM FLOW VALVE
Ralph A. Beck, Beloit, Wis., assignor to Beloit Corporation, Beloit, Wis., a corporation of Wisconsin
Filed Oct. 23, 1965, Ser. No. 503,019
9 Claims. (Cl. 137—219)

ABSTRACT OF THE DISCLOSURE

Flat stream flow valve for paper stock and the like in which the valve and valve housing are generally rectangular in cross-section. The valve is in the form of a plug valve having parallel sides sealed to opposite sides of the valve housing and having end walls converging from the center of the valve to opposite ends of the valve. An operator for the valve extends through one of the side walls of the valve housing and is out of the flow of fluid through the housing. The valve housing has aligned open ends, one of which may form an inlet and the other of which may form an outlet. Valve seats converge from the center of the housing to opposite open ends of the housing. The valve seats converging to one open end of the valve housing are of a stepped form while the valve seats at the other open end of the valve housing are plain. The end walls of the valve conform generally to the stepped and plain valve seats.

Background of the invention

More specifically, the present invention relates to a control valve for handling streams of paper stock, white water, and the like liquid suspensions without developing an undesirable churning action in the stream and without creating pockets where lumps or clusters of suspended materials can collect. While the invention will hereinafter be described in connection with valves for controlling flowing streams of paper stock, white water and the like suspensions which must be handled in a paper mill, it should be understood that the valve of this invention is not limited to such use and is capable of controlling the flow of any fluid.

Stream flow valves which have flow paths around a valve plug in both of two orthogonal directions transverse to the main flow path are generally defined as being three-dimensional. Two-dimensional valves on the other hand, have flow paths around the valve plug in only one of the two axes orthogonal to the main flow of fluid. A two-dimensional valve, therefore, throttles the flow of fluid at opposite sides of the plug while the other two sides remain in sealing engagement with the valve housing.

The present invention is of the two-dimensional stream flow type of valve having a generally rectilinear cross section with two opposite sides of the valve plug in bearing engagement with opposite inner side walls of the valve housing. The other two opposite walls of the valve housing each includes a valve seat and the valve plug includes mating valve seats for throttling the flow of fluid through the valve. The advantages of the valve of the present invention result from the flow through the valve being two-dimensional, instead of three-dimensional. The valve is generally flat sided so that the flow of fluid therethrough will experience the same throttling action as with previous valves, but only in two dimensions rather than three. The third dimension of the valve of the present invention may be considered as the dimension in which the valve plug or member is supported and adjusted within the valve housing.

One type of stream flow valve known in the prior art includes a valve member supported in a section similar to an enlarged pipe section and located a short distance from an elbow in the fluid pipe. A screw-type rod is fixed through the elbow to the valve member for external adjustment of the valve member with respect to a valve seat. Another type of prior art stream flow valve includes a valve member which is supported in a transverse direction through the pipe section and which throttles the flow of fluid therethrough in three dimensions.

These and other types of stream flow valves require support and adjustment mechanisms which obstruct the flow of fluid, causing turbulence and snag areas. Such turbulence and snag areas result in a considerable amount of power loss through the valve, which is highly undesirable in many applications.

Because the valve of the present invention is substantially rectilinear with generally flat side walls, various sizes of the same flow valve may be manufactured more readily. This advantage results from the fact that only one dimensional change is required between valves of relatively small capacity ranges and valves of relatively large capacity ranges. Therefore, separate drawings for the castings and other parts are not required and the same drawings may be employed for valves of different capacity ranges, since valves of different capacity ranges may be produced by changing only one dimension.

In addition, valves having a generally rectilinear cross section reduce flow disturbances and substantially eliminate clogging of the fluid suspensions between the valve housing and the valve member. Such a valve configuration greatly simplifies maintenance, since the entire valve housing need not be removed from the pipe section in order to replace either the valve member or the control mechanisms associated therewith.

One of the primary problems associated with valves of the prior art is that of a required high degree of precision machining necessary to conform the valve plug with the valve seat on the valve housing. The valve of the present invention, however, being substantially rectangular in cross section, results in simplified machining processes for its manufacture.

An object of the present invention, therefore, is to provide a stream flow valve of the two-dimensional type.

Another object of the present invention resides in the provision of a stream flow valve having flat sides in bearing engagement with flat side walls of the valve housing.

Still another object of the present invention is to provide a valve having characteristics which reduce flow disturbances and substantially eliminate clogging of liquid suspensions therein.

Another object of the present invention is to provide a valve which is relatively simple to maintain.

Yet another object of the present invention is to provide a stream valve which can be manufactured with relatively simple machining processes.

Yet another object of the present invention resides in the provision of adjusting members for the valve member of a stream valve which are not disposed in the flow path of fluid through the valve.

Still another object of the present invention resides in the provision of a stream valve which does not require its being positioned adjacent an elbow in a fluid conduit in order to connect adjusting or control members to the valve member thereof.

These and other objects, features, and advantages of the present invention will be more fully realized and understood from the following detailed description when taken in conjunction with the accompanying drawings wherein:

FIGURE 1 is a side elevational view of the valve of the present invention and showing a side wall of the housing thereof partially broken away to illustrate the valve member positioned therein;

FIGURE 2 is a top view of the valve showing a top wall thereof partially broken away and further showing the valve member broken away to illustrate the relationship of the control members with respect to the valve member;

Like reference numerals throughout the various views of the drawings are intended to designate the same or similar structures.

As shown on the drawings:

Figure 3:
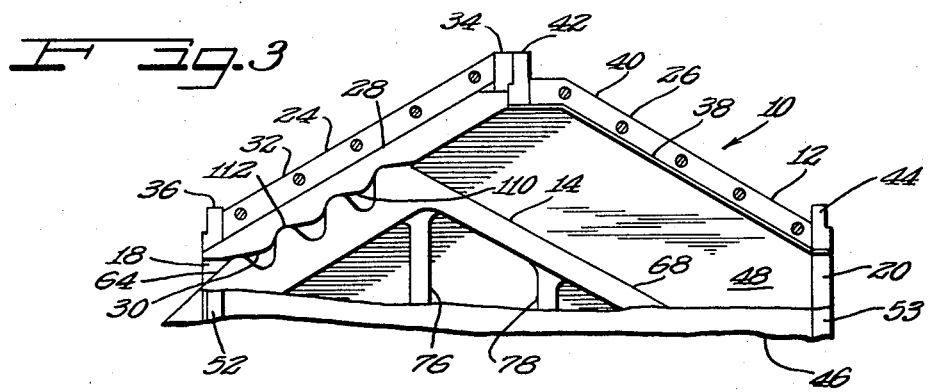
FIGURE 3 is a partial side elevational view similar to FIGURE 1 showing the valve member in closed position and abutting against the valve seat of the valve housing.

With reference to the drawings in detail and in particular to FIGURES 1 and 2, there is shown the valve of the present invention generally designated with the reference numeral 10. The valve 10 is generally comprised of a valve housing 12, a valve member or plug 14, and a control assembly 16. The housing 12 has an inlet 18 and an outlet 20 for flow of fluid through the valve as indicated by the arrows 22. It is to be understood, however, that the flow of fluid through the valve may be in the opposite direction to that shown.

The valve housing 12 is symmetrical, in that the top wall thereof is identical to the bottom wall and, therefore, reference will only be made to the top wall with respect to describing the housing. The top wall of the housing 12 is provided in two sections; an inlet section 24 and an outlet section 26. The inlet section 24 includes a valve seat plate 28 having a valve face or seat 30 on an inner surface thereof. A plurality of ribs 32 extend across the width of the plate 28 and are spaced along the length thereof to provide support to the plate 28. The ribs 32 are secured to the plate 28 by welding or by other suitable means. The ends of the ribs 32 are joined together at one edge of the plate 28 by a rib 34 and at the other edge of the plate 28 by a rib 36.

The section 26 of the top wall is formed of a plate 38 having a plurality of ribs 40 extending across the width thereof and spaced along the length thereof. The ribs 40 are also secured by welding or other suitable means to the plate 38. The ends of the ribs 40 are secured together at one edge of the plate 38 by a rib 42 and at the other edge of the plate 38 by a rib 44. The ribs 34, 42 are secured to one another to define the top wall of the housing 12.

The housing 12 includes a pair of side walls 46 and 48 which are secured to respective ribs 32, 40 at ends of the top wall by means of fasteners, such as nut and bolt assemblies 50. The side wall 46 includes a flange 52 at the inlet end thereof and a flange 53 at the outlet end thereof. Similarly, the side wall 48 includes a flange 54 at the inlet end thereof and a flange 55 at the outlet end thereof.

The rib 36 and the flanges 52, 54 are adapted for receiving one end of a section of pipe or conduit (not shown). Since the valve housing 12 is of rectilinear cross section, the section of pipe secured to the inlet 18 would also be rectilinear at one end thereof and round or otherwise conformably shaped at the other end thereof to the remaining portions of the conduit system. Similarly, the rib 44 and flanges 53, 55 at the outlet 20 are adapted for receiving one end of a pipe section.

The side walls 46, 48 of the housing 12 include elongated apertures 56 and 58 respectively. The valve plug 14 includes a pair of control members 60 and 62 extending from respective opposite sides thereof through respective apertures 56, 58.

As shown in FIGURE 2, the apertures 56, 58 are of sufficient length to allow movement of the valve plug 14 with respect to the valve seat 30 to permit throttling of fluid through the valve 10. Therefore, the control members 60, 62 are slidable within the apertures 56, 58 respectively to permit opening and closing of the valve 10. The apertures 56, 58 are of a width in proportion to the width of the control members 60, 62 to eliminate canting of the valve plug 14 within the housing 12.

Figure 4:
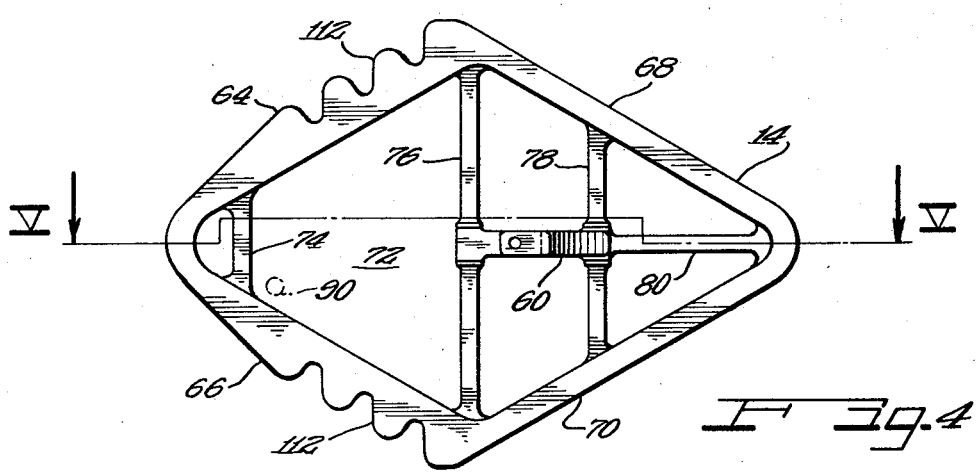
FIGURE 4 is a side elevational view of the valve member of the present invention.
Figure 5:
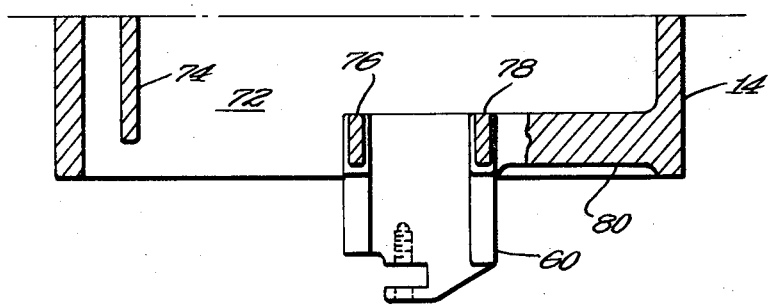
FIGURE 5 is a partial sectional view taken along line V—V of FIGURE 4.

The valve member 14 is better illustrated in FIGURES 4 and 5; a side elevational view thereof being illustrated in FIGURE 4 and, since the valve member 14 is symmetrical, one-half of a sectional view taken along line V—V of FIGURE 4 is illustrated in FIGURE 5. The valve member 14 is preferably cast or otherwise fabricated by processes known in the art in a one-piece configuration and is generally defined by inlet walls 64 and 66 and outlet walls 68 and 70 joined to one another and forming an opening or hollow portion 72 therebetween. A support member 74 joins walls 64, 66; a support 76 joins walls 64, 68 with walls 66, 70; and a support 78 joins walls 68, 70. The valve member 14 is preferably hollow as indicated at 72 to reduce the weight thereof to an absolute minimum while the support members 74, 76, and 78 provide the required strength thereto. The control members 60 and 62 extend between the support members 76, 78 and a rib 80 extends from the juncture of walls 68, 70 to the control member 60 to provide added strength thereto during movement of the valve member 14 within the housing 12. As more clearly illustrated in FIGURE 5, the ends of the walls 64, 66, 68 and 70 are flat to provide sealing engagement with the inner surfaces of the side walls 46, 48 of the housing 12. It will be noted that while the ends of the valve member 14 are slidable on the side walls 46, 48 of the housing 12, the apertures 56, 58 are sealed by the ends of the valve member 14 from the fluid path through the valve housing 12. Therefore, the valve member 14, although movable within the housing 12, encircles the apertures 56, 58 at all positions of the valve member 14 within the valve housing 12. Movement of the valve member 14, therefore, may be effected through the side walls 46, 48 without loss of sealing engagement between the ends of the valve member 14 and the side walls 46, 48.

Such movement of the valve member 14 is effected by the control assembly 16 connected to the control members 60, 62. As illustrated in FIGURES 1 and 2, the control assembly 16 includes an air motor 82 connected to a supply of air pressure (not shown) through lines 84 and 86. The air motor 82 is supported on a bracket 88 extending from the side wall 46 of the housing 12. An output shaft 90 of the air motor 82 is connected to a jack 92 secured to the bracket 88. The shaft 90 extends through a bushing 94 in the side wall 46, through the hollow portion 72 of the valve member 14, and through a bushing 96 in the side wall 48 to a second jack 98. The jack 98 is mounted on a bracket 100 extending from the side wall 48. The jacks 92, 98 each includes plunger 102 and 104 respectively extending therefrom and having linear movement in proportion to the shaft 90 rotation. The plunger 102 is connected to the control member 60 by means of a bolt 106 and the plunger 104 is connected to the control member 62 by means of a bolt 108. Therefore, when the air motor 82 is actuated through the lines 84, 86, the plungers 102, 104 move the valve member 14 within the housing 12.

As illustrated in FIGURE 4, the shaft 90 does not interfere with movement of the valve plug 14 within the housing 12. The dotted outline of shaft 90 is illustrated in relation to the valve plug 14 when the valve plug is withdrawn into the housing 12. Therefore, the valve plug 14 is free to move the distance between supports 74 and 76 if desired.

The valve of the present invention is illustrated as being a step-type valve in that the valve seat 30 of the housing 12 includes a plurality of steps 110 and the valve member 14 includes a corresponding plurality of step portions 112 in surfaces 64, 66 thereof. As illustrated in FIGURE 3, the steps 110 receive in mating engagement with step portions 112 in surfaces 64, 66 thereof. As illustrated in FIGURE 3, the steps 110 receive in mating engagement the step portions 112 for throttling the flow of fluid through the valve 10. It is to be understood, however, that the valve seats of the valve 10 need not be of the step type and may be either flat or arcuately shaped to provide a throttling action to the fluid path.

It has been found experimentally that step-type valves are superior in many respects to other valves known in the art. For instance, the step-valve provides better sensitivity for control of the fluid passing therethrough. That is, the maximum flow rate of other types of valves having the same capacity range is attained when the valve member or plug has been opened a relatively short distance, whereas the step valve may be opened a greater distance before maximum flow rate is attained. This sensitivity of the respective valves is determined predominantly by the rate at which the areas of flow restriction in the respective valves increases as the valve plugs are opened. This advantage can be realized from a consideration of the differences between a valve commonly referred to as the stream flow type and a step valve, wherein the restriction in the stream flow valve results from the straightline approach of the valve plug to a curved wall, whereas in the step valve, the valve plug has a straight-line approach to a flat wall. In addition, a further advantage is that it is possible to adjust the sensitivity of a step valve design by changing the slope of the valve housing wall.

Still another important feature of the step valve is that the tendency to cavitate is relatively lower than that of a stream flow valve. Cavitation is a consequence of low pressures which accompany high velocities in the restricted passageways of a valve. To reduce the tendency to cavitate, a valve must be designed so that it can develop large pressure drops without developing detrimental high velocities. The step valve is superior to the stream flow valve in this regard for several reasons. Firstly, the step valve has several restrictions in series, providing in effect, three separate valves in series. The stream flow valve, however, realizes the entire pressure drop across a single restriction at the valve seat thereof. Secondly, the flow efficiency of a step valve restriction is much less than that of a stream flow valve restriction, i.e., there is more pressure regain in the stream flow valve. This is due to the relatively smooth gradual diversions of the channels in the stream flow valve compared to those in the step valve design.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim as my invention:
1. A stream flow valve comprising
   (a) a valve housing having a pair of flat side walls and a reduced portion at one end thereof defining an outlet, and a valve seat at the reduced portion,
   (b) a valve member in said housing and having flat sides slidably and sealingly engaging the flat side walls of said housing, said member including a control member extending from one of the flat sides thereof and extending through an aperture in a respective one of the flat side walls of said housing, and
   (c) means external of said housing engaging said control member for moving said valve member with respect to said valve seat, the edges of one flat side of said valve member encircling the aperture in the side wall of said housing in all positions thereof.
2. The stream flow valve as defined in claim 1 wherein said means includes a motor having an output shaft, and means connecting said output shaft to said control member for moving said control member in the aperture in accordance with rotation of said shaft.
3. A stream flow valve comprising
   (a) a valve housing having a pair of flat side walls and a reduced portion at one end thereof defining a valve seat,
   (b) a valve member having a pair of flat sides each engaging a respective side wall of said housing and including a control member extending from one side thereof through an elongated aperture in one of said flat side walls of said housing, said valve member being movable within said housing and having edges thereof sealingly encircling the aperture in all positions of movement thereof, and
   (c) means for moving said control member along the elongated slot for engaging said valve member on said valve seat.
4. A stream flow valve comprising:
   (a) a housing having opposite open ends, one forming an inlet and the other forming an outlet axially aligned with said inlet and having:
      (1) a pair of flat side walls extending between said inlet and said outlet,
      (2) converging interior end walls extending to one open end of said housing,
      (3) converging valve seats extending along said converging end walls to said one open end of said housing,
   (b) a valve member having opposite flat sides in slidable engagement with said flat walls of said valve housing and sealed thereto and having opposite converging end walls conforming to said valve seats, and
   (c) means for moving said valve member with respect to said valve seats to vary the flow along opposite ends of said valve member along said valve seats to said outlet.
5. A stream flow valve in accordance with claim 4, wherein said valve seats are stepped and said valve member has stepped portions corresponding to said stepped valve seats.
6. A stream flow valve comprising:
   (a) a housing having an inlet at one end thereof and an axially aligned outlet at the opposite end thereof and having
      (1) a pair of parallel flat side walls,
      (2) diverging and converging top and bottom valve seats diverging from said inlet and converging to said outlet,
   (b) a flat valve member having:
      (1) opposite parallel sides sealingly engaged with the flat side walls of said housing and slidably guided therealong for movement between said inlet and said outlet and having;
      (2) opposite flat end surfaces conforming to said valve seats to vary the flow of fluid along the top and bottom surfaces of said valve to said outlet, upon movement of said valve along said housing.
7. A stream flow valve comprising:
   (a) a valve housing having an inlet and an axially aligned outlet and opposite parallel internal side walls and internal flat end walls in transverse section converging from said inlet and diverging to said outlet to define valve seats having flat flow surfaces,
   (b) a flat valve member conforming to said side walls and valve seats of said housing and sealed to said side walls for slidable movement therebetween, the end walls of said valve member being parallel to said end walls of said valve housing, and cooperating therewith to define flat valve surfaces, controlling the flow of fluid along opposite sides of said valve member from said inlet to said outlet.

8. The stream flow valve of claim 7,
wherein the valve seats at one end of said valve housing are stepped, and
wherein the end walls of said valve member extending along the stepped portions of said valve seats are stepped to generally correspond to the stepped portions of said valve seats.

9. A stream flow valve in accordance with claim 8, wherein means are provided out of the flow of fluid through said housing for moving said valve member with respect to said valve seats.

References Cited

UNITED STATES PATENTS 1,649,953  11/1927  Ernst _____ 137—625.33
3,291,440  12/1966  Archer et al. ____ 251—340 XR

FOREIGN PATENTS 458,932  1/1926  Germany.

M. CARY NELSON, *Primary Examiner.*

MICHAEL O. STURM, *Assistant Examiner.*